United States Patent [19]
Chaumet

[11] 3,902,479
[45] Sept. 2, 1975

[54] METHOD AND APPARATUS FOR HEARTBEAT RATE MONITORING

[75] Inventor: Serge Georges Julien Chaumet, Clamart, France

[73] Assignee: Hoffmann-La Roche Inc., Nutley, N.J.

[22] Filed: Feb. 15, 1974

[21] Appl. No.: 443,174

[30] Foreign Application Priority Data
Feb. 16, 1973 France .................. 73.05660

[52] U.S. Cl. .................................. 128/2.06 A
[51] Int. Cl.² ................................. A61B 5/04
[58] Field of Search ..... 128/2.06 A, 2.06 F, 2.06 G, 128/2.06 R, 2.05 Q; 235/190, 186

[56] References Cited
UNITED STATES PATENTS

| | | | |
|---|---|---|---|
| 3,087,488 | 4/1963 | Streimer | 128/2.05 Q |
| 3,144,019 | 8/1964 | Haber | 128/2.06 A |
| 3,267,933 | 8/1966 | Mills et al. | 128/2.06 A |
| 3,460,527 | 8/1969 | Karsh | 128/2.06 A |
| 3,533,402 | 10/1970 | Siedband | 128/2.06 A |
| 3,780,280 | 7/1973 | Games | 235/190 |

*Primary Examiner*—William E. Kamm
*Attorney, Agent, or Firm*—Samuel L. Welt; Bernard S. Leon; Mark L. Hopkins

[57] ABSTRACT

A method and apparatus are disclosed for heartbeat rate monitoring and more particularly monitoring of cardiac rhythm, by analyzing an electrocardiographic signal. The invention provides the derivation of a signal representative of the width of the base of the R-wave of each QRS complex of the electrocardiographic signal by forming the quotient of the crest-to-crest amplitude of the electrocardiographic signal by the crest-to-crest amplitude of the derivative of the electrocardiographic signal in relation to time. The amplitude of this derived signal is compared with an adjustable threshold value, wherein an output signal may be generated which is indicative of an abnormal QRS complex when the amplitude of the derived signal exceeds the threshold value.

12 Claims, 7 Drawing Figures

3,902,479

METHOD AND APPARATUS FOR HEARTBEAT RATE MONITORING

BACKGROUND OF THE INVENTION

The invention relates to a method and apparatus for monitoring cardiac rhythm.

The activity of the heart muscle is shown on an electrocardiogram by a succession of wave complexes PQRST which succeed one another at regular intervals when the heart muscle is functioning normally. Each wave complex, associated with the successive phenomena of depolarization and repolarization of the auricles and ventricles of the heart during a heart beat or systole, has a repetitive shape in the case of normal heart muscle functioning, especially as regards the width of the base of the wave R, which, when expressed in time units, has a value of the order of 90–100 ms.

An abnormal shape of the wave complex QRS of the electrocardiogram, especially a wider base of the wave R than that stated above, of course indicates a pathological condition. This is the case with ventricular extra systoles which correspond to an abnormal excitation of the heart muscle and which it is important to identify, since they may indicate dangerous cardiac arhythmia.

To measure the width of the base of the wave R, the times at which the wave starts and finishes might be determined to define the interval in time separating those two events. However, it is a relatively complicated matter to put a process of that kind into effect, and moreover it is not fully reliable, due especially to the parasite signals or noises accompanying the recording of the wave complex of the electrocardiogram.

SUMMARY OF THE INVENTION

It is an object of the invention to provide a method and apparatus for monitoring cardiac rhythm which supplies at each instant not the exact value of the width of the base of the wave R for the electrocardiogram, but an indication representing such width and of a sufficiently reproducible and significant nature to enable abnormal wave complexes to be identified in the electrocardiogram with satisfactory accuracy.

The method according to the invention for monitoring cardiac rhythm from the analysis of an electrocardiogram is characterised in that for each QRS wave complex of the electrocardiogram the width of the base of the wave R is estimated from the development of a signal representing such complex.

According to another feature of the method according to the invention, the value indicating the width of the base of the wave R of each wave complex of the electrocardiogram is obtained by forming the quotient of the crest to crest amplitude of a signal representing the electrocardiogram by the crest to crest amplitude of the derivative of such signal in relation to time.

An apparatus for monitoring cardiac rhythm by the performance of the method according to the invention therefore comprises means for determining the crest to crest value of the electrocardiogram signal for each wave complex QRS, means for determining the crest to crest value of the derivative of the signal representing the electrocardiogram in relation to time, and means for forming the quotient of the two values to supply at their output a signal indicating the width of the base of the wave R of each wave complex of the electrocardiogram.

According to another feature of the invention, it comprises means for storing the crest to crest value of the electrocardiogram signal for each wave complex of QRS, means for storing the crest to crest value of the derivative of the signal representing the electrocardiogram in relation to time, and means for forming the quotient of the stored values for each wave complex.

DESCRIPTION OF THE PREFERRED EMBODIMENT

Figure 1:
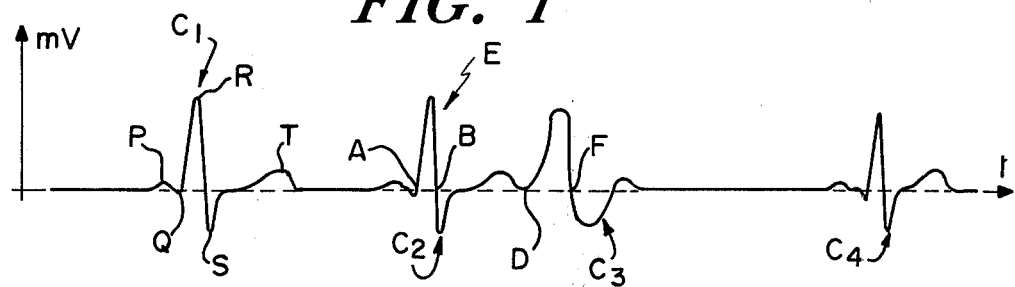
FIG. 1 shows an electrocardiogram.

FIG. 1 shows an electrocardiogram E represented in a system of rectangular axes, time being plotted on the abscissa axis, and an electric voltage expressed, for instance, in millivolts, being plotted on the ordinate axis. The electrocardiogram E is formed by a succession of wave complexes $C_1$–$C_4$ . . . each of which comprises in known manner a wave P, a wave Q, a wave R, a wave S, and a wave T which correspond to the depolarization and repolarization of the auricles and ventricles of the heart muscle whose activity is indicated by the electrocardiogram. In the electrocardiogram the complexes $C_1$, $C_2$ and $C_4$ relate to normal systoles, especially as regards the size of the base of the wave R which, measured in the case of the complex $C_2$ between the points A and B of intersection of the electrocardiogram curve with the time axis, has a value of the order of 90–100 ms. In contrast, the width of the base of the wave R of the complex $C_3$, as measured by the segment DF, is greater than 120 ms, this corresponding to an abnormal heart contraction, for instance, a ventricular extra systole resulting from the nerve inflow controlling the heart muscle being propagated not along the normal excitation channels of the muscle, but along other channels, for instance, through the myocardium.

To enable cardiac rhythm to be monitored by detecting abnormal complexes of the electrocardiogram without the necessity of determining the exact width of the base of the wave R of a wave complex QRS of an electrocardiogram, according to the invention there is associated with each wave complex a value indicating the width of the base of the wave R of the complex, such value or index, referred to hereinafter as $i$, having a link of proportionality sufficiently reproducible to ensure that abnormal complexes of the electrocardiogram are distinguished with satisfactory accuracy from its normal complexes.

In one embodiment of the invention the index $i$ is defined as the value of the ratio between the crest to crest amplitude of the signal representing the QRS complex and the crest to crest amplitude of the first derivative of such signal in relation to time.

Figure 2A:
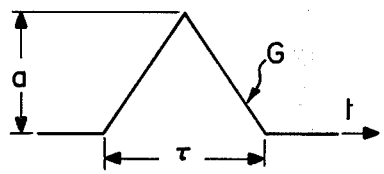
FIGS. 2a and 2b are graphs illustrating respectively a triangular signal and the derivative in relation to time of the triangular signal.
Figure 2B:
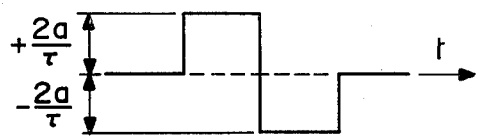

If we take a signal represented by triangle G (FIG. 2a) in a system of rectangular axes in which time is plotted on the abscissa axis, $\tau$ denoting the width of the base of the signal G whose amplitude is $a$, and the derivative in relation to the time of the function represented by G being, as shown in FIG. 2b, a signal extending over an area of width $\tau$, of positive crest value $2a/\tau$ and negative crest value $2a/\tau$, i.e. of total amplitude $4a/\tau$, the index $i$, as defined hereinbefore, and equal to:

$$i = \frac{a}{\frac{4a}{\tau}} = \frac{\tau}{4}$$

is in fact proportional to the width $\tau$ of the triangular signal and independent of the amplitude $a$ thereof. Although as shown in FIG. 1 the electrocardiogram signal is not formed by a succession of triangles, it has been found that the proportionality relationship between the value of the index $i$ and the width of the base of the signal of the wave R of an electrocardiogram wave complex was reproducible enough to enable abnormal wave complexes to be distinguished and therefore the cardiac rhythm to be monitored.

Figure 3:
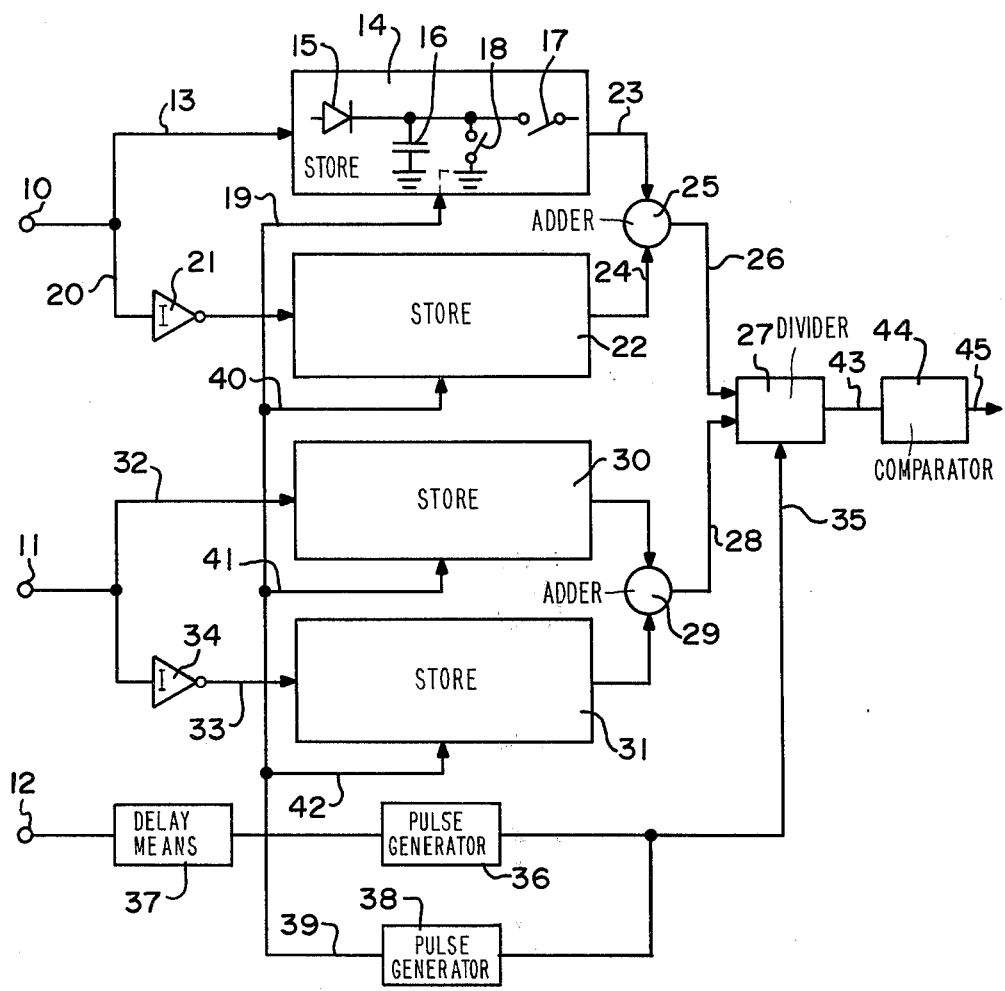
FIG. 3 is a diagrammatic block circuit of an apparatus according to the invention.

The apparatus for the performance of the method according to the invention (FIG. 3) comprises a first input terminal 10 to which a voltage representing the electrocardiogram is applied, a second input terminal 11 to which the derivative in relation to time of the voltage representing the electrocardiogram is applied, such voltage being obtained by any suitable means, for instance, and analog process, and the third input terminal 12 to which there are applied synchronous pulses of the waves R of the electrocardiogram which are derived there from by filter means and can be used to determine the cardiac rhythm in annexed counting means (not shown).

The input terminal 10 is connected via a channel 13 to a device 14 for storing the crest amplitude of the electrocardiogram signal, which comprises in its simplest form a circuit with diode 15 and capacitor 16 whose read out of the stored value is performed by means of the switch 17, for instance a field effect transistor, while, after the stored information has been read out, the capacitor 16 is discharged by a switch 18 controlled by a zero resetting channel 19.

Parallel with the channel 13 and also connected to the input terminal 10 is a channel 20 comprising an inverter 21 followed by a device 22 similar to the device 14 for storing the crest amplitude of the inverse voltage from that applied to the device 14. The outputs 23, 24 of the devices 14, 22 are totalled in a member 25 to whose output 26 there is fed the crest to crest amplitude value of the electrocardiogram signal, independently of any continous level thereof due to the presence of the inverter 21 in the channel 20.

A channel 26 forms a first input of a divider device 27 forming the quotient of the value present in the channel 26 by the value present in a channel 28 extending from an adding member 29 connected to devices 30, 31, similar to the devices 14, 22, provided to store the maximum amplitude value of the signals which they receive via the channels 32, 33 from the input terminal 11, i.e., the derivative in relation to time of the electrocardiogram signal on the one hand, and the inverse of such derivatives supplied over channel 33 by an inverter 34 on the other.

The quotient-forming device 27, which is, for instance, an analog divider, is rendered operative when it receives via an input 35 pulses of duration $\tau_2$ produced by a device 36 from synchronous pulses of the waves R applied to the input terminal 12 and having in relation to the moment of appearance of the waves R a delay $\tau_1$ introduced by a delay line device 37 or the like.

The pulses delivered by the device 36 are also applied to a device 38 which delivers at its output 39 pulses of duration $\tau_3$ for zero resetting via channels 19, 40, 41 and 42 of the storage means 14, 22, 30 and 31 respectively.

The apparatus operates as follows. When the electrocardiogram signal on the one hand and the derivative in relation to time of such signal on the other are applied to the input terminals 10, 11, the maximum amplitude of each of the signals is stored in a device 14, 30 respectively by the charging of the capacitors, as 16, while in the devices, as 22 and 31, the maximum amplitude of the inverse signals is stored, so that the crest to crest amplitude of the electrocardiogram signal and the crest to crest amplitude of the derivative in relation to time of such signal are obtained via channels 26, 28 at the output of the adding means 25 and 29.

Figure 4A:
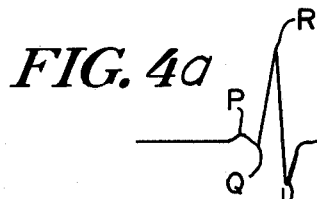
FIG. 4a shows an electrocardiographic signal.
Figure 4B:
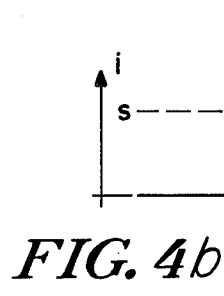
FIG. 4b shows pulses derived from the signal shown in FIG. 4a with the apparatus of FIG. 3.
Figure 4C:
FIG. 4c shows a pulse representative of an R-wave having an abnormal width.

To allow the charging of the capacitors, as 16, for storing the maximum amplitude values of the signals applied to the terminals 10, 11, according to the invention the dividing device 27 is rendered operative at a moment distant from the appearance of the wave R of the electrocardiogram of a duration $\tau_1$ (FIG. 4b), and then the device 27 is controlled by a sampling pulse of duration $\tau_2$ supplied by the device 36, to cause to appear at output 43 of the device 27 a pulse I (FIG. 4b) whichhas the same duration as the sampling pulse and whose amplitude is proportional to the index $i$ defined hereinbefore. When the pulse I supplied by the device 27 is introduced into a comparator 44 of adjustable threshold level $s$, the latter supplies at its output 45 information concerning an abnormal wave complex for each pulse I' of amplitude greater than the threshold $s$. A pulse I' of this kind (FIG. 4b) can either be translated into a graph or oscillograph recording by a pulse K (FIG. 4c), or alternatively or simultaneously fed to an alarm or telemonitoring device adapted to inform an observer at any moment of the appearance of abnormal electrocardiogram wave complexes.

The value of the threshold $s$ is determined for each patient either by means of a calibration curve or by a preliminary adjustment, advantageously also defining a lower threshold to obviate parasite signals.

Using simple means, and at a reduced cost the invention disclosed hereinbefore enables abnormal electrocardiogram wave complexes to be detected with satisfactory accuracy in spite of the presence of parasite signals or noises accompanying the recording of the electrocardiogram wave complex.

I claim:

1. A method of monitoring cardiac rhythm by analyzing an electrocardiographic signal, comprising deriving a signal representative of the width of the base of the R-wave of each QRS complex of the electrocardiographic signal by forming the quotient of the crest-to-crest amplitude of the electrocardiographic signal by the crest-to-crest amplitude of the derivative of the electrocardiographic signal in relation to time.

2. A method according to claim 1 further comprising storing both crest-to-crest values prior to forming the quotient thereof.

3. A method of monitoring cardiac rhythm by analyzing an electrocardiographic signal, comprising:

deriving a signal representative of the width of the base of the R-wave of each QRS complex of the electrocardiographic signal by forming the quotient of the crest-to-crest amplitude of the electrocardiographic signal by the crest-to-crest amplitude of the derivative of the electrocardiographic signal in relation to time; and comparing the amplitude of the derived signal with an adjustable threshold value, and generating an output signal indicative of an abnormal QRS complex when the amplitude of the derived signal exceeds the threshold value.

4. An apparatus for monitoring cardiac rhythm from an electrocardiographic signal comprising:

means for determining the crest-to-crest value of the electrocardiographic signal for each QRS wave complex;

means for determing the crest-to-crest value of a signal representative of the derivative of the electrocardiographic signal in relation to time for each QRS wave complex; and means for forming the quotient of the two determined values to provide an output signal representative of the width of the base of the R-wave of each QRS wave complex of the electrocardiographic signal.

5. An apparatus according to claim 4 further comprising:

first storage means for storing the crest-to-crest value of the electrocardiographic signal; and second storage means for storing the crest-to-crest value of a signal representative of the derivative of the electrocardiographic signal.

6. An apparatus according to claim 5 wherein said first and second storage means include diode and capacitor circuits which are controlled by electronic switching means for performing read-out and resetting of said first and second storage means.

7. An apparatus according to claim 5 further comprising means for generating sampling pulses for controlling the operation of the quotient-forming means and zero-resetting of the storage means, each said sampling pulse being derived from a synchronous pulse of the R-wave of a QRS wave complex.

8. An apparatus according to claim 4 further comprising means for generating sampling pulses for controlling the operation of the quotient-forming means, each sampling pulse being derived from a synchronous pulse of the R-wave of a QRS wave complex and having a predetermined adjustable time lag in relation to said synchronous pulse.

9. An apparatus according to claim 4 wherein the means for determining the crest-to-crest value of the electrocardiographic signal comprises two parallel channels having a common input and outputs which are connected to an adding member, each of which channels includes storage means, and one of said channels further includes an inverter for inverting the electrocardiographic signal applied to the input terminal shared by the two channels.

10. An apparatus according to claim 9 wherein said storage means includes diode and capacitor circuits which are controlled by electronic switching means for performing read-out and resetting of the storage means.

11. An apparatus according to claim 4 wherein said means for determining the crest-to-crest value of the signal representative of the derivative of the electrocardiographic signal comprises two channels having a common input and whose outputs are connected to an adding member, each of which channels includes storage means, and one of said channels further includes an inverter for inverting the signals applied to the input terminals shared by the two channels.

12. An apparatus according to claim 4 further comprising means for comparing the output signal of the quotient-forming means with a threshold signal of adjustable value.

* * * * *